United States Patent

Damm et al.

[11] 4,441,570
[45] Apr. 10, 1984

[54] CONNECTING A HUB TO THE DRIVE OF A TRACTION CHAIN VEHICLE, OR THE LIKE

[75] Inventors: Horst Damm, Sprockhövel; Hartwig Pfordt, Witten, both of Fed. Rep. of Germany

[73] Assignee: Mannesmann AG, Duesseldorf, Fed. Rep. of Germany

[21] Appl. No.: 330,327

[22] Filed: Dec. 14, 1981

[30] Foreign Application Priority Data

Dec. 22, 1980 [DE] Fed. Rep. of Germany ....... 3048922

[51] Int. Cl.³ ............................................. B26D 55/12
[52] U.S. Cl. .................................... 180/9.62; 74/788; 180/255
[58] Field of Search ................. 180/9.62, 255; 74/785, 74/788

[56] References Cited

U.S. PATENT DOCUMENTS 3,469,647  9/1969  Brown .................................. 180/255
4,043,226  8/1977  Buuck .................................. 74/785

FOREIGN PATENT DOCUMENTS 7025197 11/1970 Fed. Rep. of Germany .

OTHER PUBLICATIONS

Lohmann & Stolterfoht, Liste 631, VIII/78.
Lohmann & Stolterfoht, Liste 618, VIII/78.

Primary Examiner—John A. Pekar
Assistant Examiner—D. Lynn Fugate
Attorney, Agent, or Firm—Ralf H. Siegemund

[57] ABSTRACT

A mounting sleeve extends from a vehicle body or other housing and contains on its body/housing side a planetary gearing whereby, in particular, the sleeve is provided with an internal ring gear for planetary gearing; the sun gear is carried by an input shaft, and the planet gear carrier is integral with a shaft which is keyed to a hub; the hub is journaled by two roller bearings in the mounting sleeve both being on the same side, as far as the planetary gearing is concerned. The roller bearing elements are of a frustoconical configuration, and their axes are particularly oriented to prevent the reaction of radial and axial forces into the gearing.

4 Claims, 1 Drawing Figure

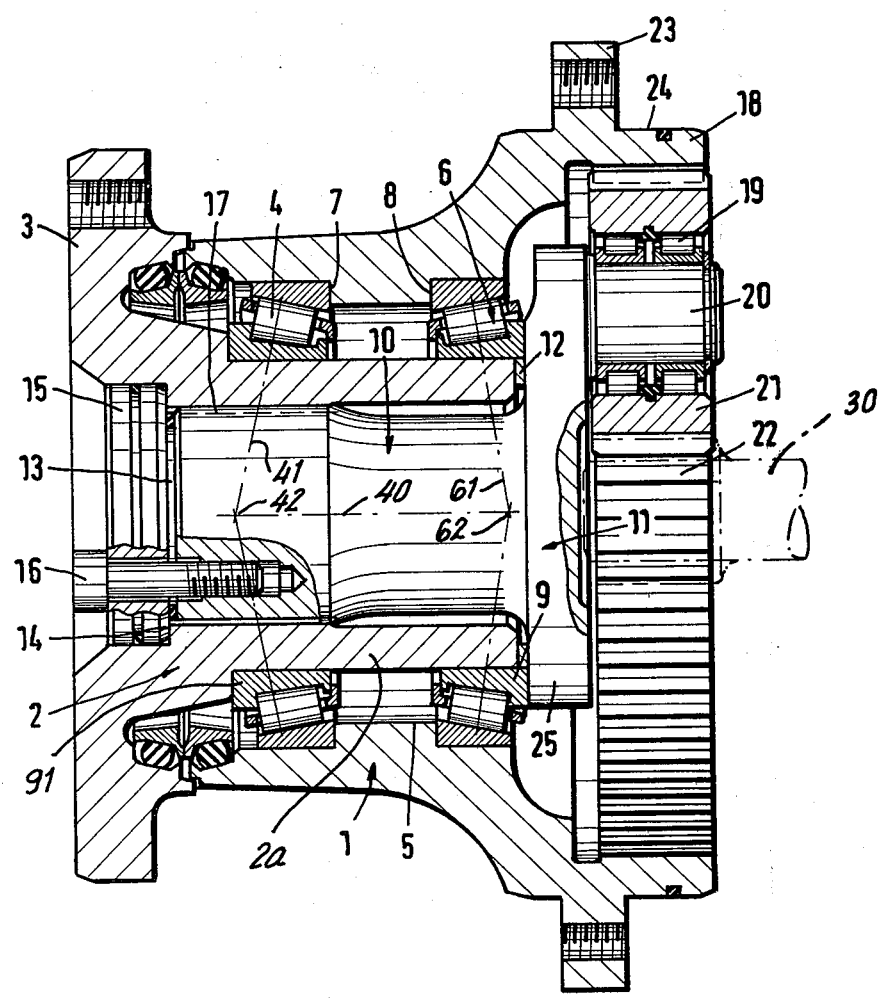

CONNECTING A HUB TO THE DRIVE OF A TRACTION CHAIN VEHICLE, OR THE LIKE

BACKGROUND OF THE INVENTION

The present invention relates to a chain drum hub for a tracked vehicle, a dredge, or the like.

Hubs of the type to which the invention pertains are, for example, constructed for being two-fold journaled while being connected to the drive shaft of a motive power source and drive. Furthermore, a power-branching transmission gear of the planetary type is provided.

Hubs of the type to which the invention pertains are, for example, traded under the name MOBILEX and described in brochures of Lohmann & Stolterfoht GmbH, Witten, List No. 631, I/78, and List No. 618, VIII/78. In these particular constructions, the hub is only indirectly journaled by means of the drive shaft; the latter is journaled in a hollow case and housing portion while the hub is placed onto that shaft and secured thereto. The two bearings are situated to both sides of a planetary gearing. Forces resulting from radial and axial loads are, thus, reacted into the gearing which is an undesirable feature. The gearing must be designed to takes up these forces.

U.S. Pat. No. 3,469,647 discloses a particular combination for a steering wheel, the steering column and a planetary gearing. In this particular construction, there is also a pair of bearings, one of them journaling the planet carrier to the case carrying the internal ring gear while the shaft, as connected to the sun gear, is separately journaled to that case by the second bearing of the pair. This principle is not applicable to dredge drums and related equipment because the hub for such a drum is insufficiently supported by just one set of bearings.

German petty patent 70 25 197 is of some additional peripheral interest.

DESCRIPTION OF THE INVENTION

It is an object of the present invention to provide for a connection of a hub to the drive of a tracked vehicle, chain drum, dredge drum, or the like, which ensures that external forces are reacted into the case or housing with minimal loading of a speed reduction gearing.

In accordance with the preferred embodiment of the present invention, a dredge drum or chain drum for a vehicle is journaled and mounted as follows. A mounting and journaling sleeve extends from a housing or case (e.g., the vehicle body) and includes, on its vehicle body side, a planetary gearing whereby the sleeve includes, in particular, the internal ring gear of the planetary gearing. The sun gear is mounted to the drive shaft that extends from the drive inside the case, housing, or vehicle body. The hub member (a) is provided to positively (form closed) receive the shaft, (b) is additionally fastened to the shaft, (c) is journaled in the sleeve by means of two roller bearings both of which extend to the same side of the planetary gearing, whereby the roller elements of the two bearings (d) are of frustoconical configuration, (e) have their smallest sides oriented toward each other, and (f) have their axes inclined in the same radial inward direction.

The rather robust construction of this mounting and journaling structure including particularly (i) the integration of the shaft and of the planetary gearing, (ii) the structural combination of the internal ring gear of the planetary gearing and of the mounting sleeve, and (iii) the utilization of particularly oriented conical roller elements for two bearings of the hub between the planetary gear and the rotational output side of the hub as a large support area of the hub, permit the reaction of all external forces, particularly the frequently appearing tilting forces, into the mounting sleeve and from there directly into the case, housing or vehicle as a whole, thereby bypassing the planetary gearing.

DESCRIPTION OF THE DRAWINGS

While the specification concludes with claims, particularly pointing out and distinctly claiming the subject matter which is regarded as the invention, it is believed that the invention, the objects and features of the invention, and further objects, features and advantages thereof, will be better understood from the following description taken in connection with the accompanying drawings, in which:

The FIGURE illustrates an example of the preferred embodiment of the present invention for practicing the best mode thereof.

The FIGURE illustrates a hub 2, having a principal hub portion 2a and a flange 3 for purposes of mounting same to a dredge drum, a chain drive, or the like. The cylindrical portion 2a is received in a hollow axle or mounting sleeve 1 and journaled therein in a twofold manner, there being an outer cone roller bearing 4 and an inner cone roller bearing 6. The bearings are particularly characterized by the use of frustoconical bearing elements running on annular but correspondingly obliquely oriented race surfaces. Reference numeral 10 refers to the drive shaft which is, in turn, received by and in the cylindrical hub portion 2a.

The bearings 4 and 6 are provided in a so-called "O-arrangement," i.e., the axes of adjacent bearing elements define a very shallow "V" as can be seen in two instances in the FIGURE. As far as any frustoconical roller bearing element is concerned, it reacts to forces as they appear between the hub 2 (as connected to some drive element, traction device such as a chain, etc.) and the mounting sleeve 1 which is bolted to a vehicle body case, housing, or the like. In view of the employment of conically shaped roller elements for the bearings, the spacing between the intersection points (42 and 62) of, on the one hand, the median forces acting along oblique lines (such as 41 and 61) and resulting from external forces, and of, on the other hand, the geometric axis 40 of the drive shaft 10, from each other is significantly larger than in the case of employment of cylindrical rollers as bearing elements.

The support and mounting sleeve 1 is provided with a fastening flange or lugs 23 having threaded bores for connection to the vehicle body, particularly a transmission case thereof (not shown), or the like. Sleeve 1 is, in addition, provided with a collar 24 for purposes of centering the sleeve in that body or case. The inside of collar 24 is constructed as an annular, internal gear 18, pertaining to a planetary gearing.

The planet gearing in question includes a spider or planet gear carrier 11 for planet gears 21, the latter being journaled on pins 20 by means of bearing 19, which pins extend axially from the carrier 11. The planet gears 21 mesh the annular or ring gear 18. The planetary gearing includes, additionally, a center or sun gear 22 which sits on a shaft 30 being driven by an appropriate motive power source.

The shaft 10, being driven by the planet gearing, is actually integral with the planet gear carrier 11 and is, furthermore, provided with a front portion 17. That shaft portion has an overall cylindrical configuration, but is provided with splines so as to fit in contour-matching relation in similar splines in the interior of hub 2. These cylindrical portions thus provided for mutual keying in order to establish a form-close, contour-matching relation between the shaft and the hub; there will be a significant amount of torque transmitted from the shaft to the hub while radial and axial forces interact between these elements which, as per the inventive configuration and construction, bypass the planetary gearing. The keyed zone between the shaft 10 and the hub 2 is in radial alignment with bearings 4.

The shaft 10, particularly the splined portion 17 thereof, has a front end 13 located in spaced-apart relation from a step or shoulder 14 in the hub bore. A tension disk 15 rests against this annular step and shoulder, and bolts, such as 16, fasten the tension disk to shaft 10 while the disk 15 is urged against this step 14.

On the other end of shaft 10 a spacer ring 12 fixes the position of carrier 11 in relation to the inner axial end of hub 2, ring 12 bearing firmly against that hub end. The hub portion 2a is, thus, compressed between the disk 15 and the spacer 12 as the bolts force the disk 15 against the shoulder 14, and the tensioned shaft 10 has its flange-like spider and planet carrier 11 urged against the spacer 12 which, in turn, bears against the end of hub portion 2a.

The mounting sleeve 1 is provided with an inwardly oriented ridge 5 separating the bearings 4 and 6 from each other. This ridge 5 provides an axial thrust support for the two bearings. The bearings each have an outer race, 7 and 8 respectively, which each engage shoulders of the ridge 5 from opposite sides. The inner races 9 and 91 of bearings 6 and 4 respectively sit on the hub 2, whereby race 91 engages a shoulder of hub 2 and race 9 does, in particular, extend axially beyond the hub 2, circumscribing the spacer disk 12 and engaging planet carrier 11.

The invention is not limited to the embodiments described above; but all changes and modifications thereof, not constituting departures from the spirit and scope of the invention, are intended to be included.

We claim:

1. A mounting structure comprising:
   a mounting sleeve for connection to, or being part of, a case or housing and having an annular gear being an internal ring gear for a planetary gearing;
   a shaft having on one end an enlarged portion to serve as planet gear carrier, the carrier journaling a plurality of planet gears meshing with the internal ring gear;
   a hub having a sleeve-like portion receiving said shaft in form-close relation, and having a mounting flange on its other end;
   a pair of bearings, each with conical rollers, the axes of the rollers of the two bearings being inclined toward each other, the bearings of the pair journaling the hub, on its outside, in the mounting sleeve; and
   a first one of the bearings having an inner race and an outer race, the inner race engaging a shoulder of the hub, the outer race engaging a shoulder of a radially inward oriented ridge separating the two bearings; and
   a second one of the bearings having an inner race and an outer race, the outer race of the second bearings engaging said ridge on its other side, axially in relation to the outer race of the first bearings, the inner race of the second bearings extending beyond the hub.

2. A structure as in claim 1, said race of the second bearings engaging the planet carrier, there being a spacer ring interposed between the hub and the planet carrier.

3. A structure for mounting a driven hub, comprising:
   a mounting sleeve having an equipment side and a hubmounting side;
   a planetary gearing mounted in the sleeve at the equipment side, the sleeve provided in parts for and as a internal ring gear of the planetary gearing, the gearing including a planetary gear carrier;
   a hub inserted in the sleeve and mounted therein in two roller bearings having conical roller bearing elements, smaller diameter sides of the bearing elements of the two roller bearings being relatively close to each other;
   a first one of the bearings having an inner race and an outer race, the inner race engaging a shoulder of the hub, the outer race engaging a shoulder of a radially inward oriented ridge separating the two bearings; and
   a second one of the bearings having an inner race and an outer race, the outer race of the second bearings engaging said ridge on its other side, axially in relation to the outer race of the first bearings, the inner rade of the second bearings extending beyond the hub.

4. A mounting structure, comprising:
   a mounting sleeve for connection to, or being part of, a case or housing and having an annular gear being an internal ring gear for a planetary gearing;
   a shaft having on one end an enlarged portion to serve as planet gear carrier, the carrier journaling a plurality of planet gears meshing with the internal ring gear;
   a hub having a sleeve-like portion receiving said shaft in form-close relation, and having a mounting flange on its other end;
   said shaft having another end, the hub having on its inside a shoulder facing away from the shaft and being spaced from said other end of the shaft; and
   fastening means including a tension disk for fastening the hub to the shaft, the tension disk engaging the shoulder, the fastening means further including bolts engaging the tension disk and being threadedly inserted in said other shaft end.

* * * * *